No. 758,858. PATENTED MAY 3, 1904.
M. SCHMIDT & E. J. GEBLER.
PRINTING PRESS.
APPLICATION FILED APR. 27, 1903.
NO MODEL.

Witnesses:—

Inventors:—

No. 758,858. Patented May 3, 1904.

UNITED STATES PATENT OFFICE.

MAX SCHMIDT AND EUGEN JOHANNES GEBLER, OF DRESDEN, GERMANY.

PRINTING-PRESS.

SPECIFICATION forming part of Letters Patent No. 758,858, dated May 3, 1904.

Application filed April 27, 1903. Serial No. 154,594. (No model.)

*To all whom it may concern:*

Be it known that we, MAX SCHMIDT and EUGEN JOHANNES GEBLER, both subjects of the King of Saxony, and residents of Dresden, Saxony, German Empire, have invented certain new and useful Improvements in Printing-Presses, of which the following is a specification.

The customary constructions of printing-presses for zinc or the like prints show various disadvantages, inasmuch as the twofold revolution of the form-cylinder at each revolution of the impression-cylinder is brought about only unsatisfactorily by a variety of levers, eccentrics, draw-rods, or forks. To the form-cylinder is imparted a jerky uneven motion, and especially when running at high speed the machine parts are apt to vibrate enough to materially influence the work.

To do away with these disadvantages is the object of our present invention, and we will now describe it with reference to the accompanying sheet of drawings, which shows three different positions of the impression and form cylinders provided with our new improvements.

To the one side of the form-cylinder $a$ is secured the cog-wheel $b$, and the impression-cylinder $c$ carries correspondingly the toothed wheel $d$, having several teeth more than the wheel $b$.

Rigidly secured to the cylinders $a$ and $c$ or to their shafts $f$ and $g$ or the toothed wheels $b$ and $d$ are the cams $h$ $i$, with curved working surfaces. Back of the cam $i$ several teeth are broken out of the toothed wheel $d$.

Figure 1:
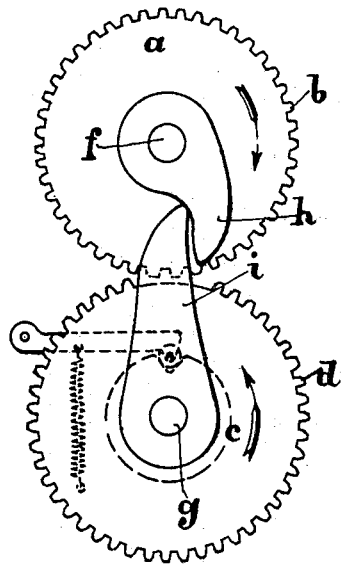
Figure 2:
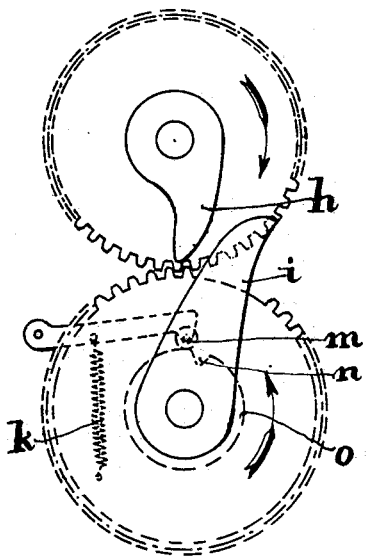
Figure 3:
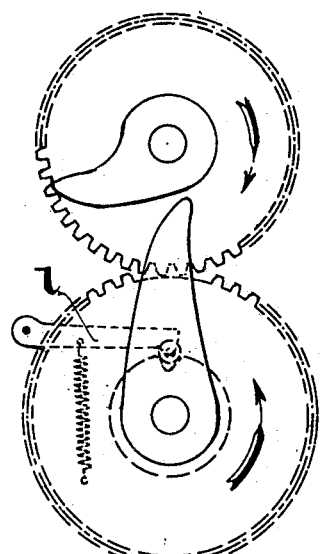

The mode of operation of the device is the following: If the toothed wheel $a$ is turned from the position shown in Figure 1 in the direction of the arrow, the cam $h$ takes along the cam $i$, and thereby rotates the toothed wheel $d$ until the teeth of both toothed wheels mesh. The cycloid form of the cam-surfaces causes a shockless and gradual taking along of the printing-cylinder. Since now the toothed wheel $b$ is smaller than the toothed wheel $d$, the cam $h$ will assume the position shown in Fig. 2—*i. e.*, it will gain on the cam $i$. Only when the last tooth of the toothed wheel $d$ leaves the teeth of the wheel $b$ the cam $i$ will assume again the normal position shown in Fig. 1, the cam $h$ picking up the cam $i$, so that also the arrest of the cylinder $c$ will take place gradually and without shock. At the next ensuing revolution the printing-cylinder will remain in the position shown in Fig. 3, while after a complete revolution of the form-cylinder $a$ the position according to Fig. 1 is reached again.

Any well-known locking device—for instance, a lever $l$, with finger $m$, influenced by spring $k$ and adapted to engage a recess $n$ of disk $o$—may be used to hold the printing-cylinder temporarily stationary.

Our described construction permits of both cylinders being worked in either direction—a decided improvement over the other constructions, which permit of rotation only in one direction.

What we claim, and desire to secure by Letters Patent, is—

In printing-presses, the combination of a form-cylinder, a toothed wheel and a cam, rigidly secured to the said form-cylinder, an impression-cylinder of larger diameter than the said form-cylinder, a toothed wheel with a number of teeth cut away and a cam, rigidly secured to the said printing-cylinder, and means for temporarily holding the said printing-cylinder stationary, the parts being constructed, arranged and coöperating, substantially as and for the purpose set forth.

In testimony that we claim the foregoing as our invention we have signed our names in presence of two subscribing witnesses.

MAX SCHMIDT.
EUGEN JOHANNES GEBLER.

Witnesses:
WALRAM DERICHSWEILER,
PAUL ARRAS.